(12) United States Patent
Zhang et al.

(10) Patent No.: US 11,710,332 B2
(45) Date of Patent: Jul. 25, 2023

(54) ELECTRONIC DOCUMENT DATA EXTRACTION

(71) Applicant: Bill.com, LLC, San Jose, CA (US)

(72) Inventors: Changlin Zhang, Fremont, CA (US); Bryan Wang, Cupertino, CA (US); Akshay Ukey, Santa Clara, CA (US); Sangam Singh, San Ramon, CA (US)

(73) Assignee: BILL.COM, LLC, San Jose, CA (US)

( * ) Notice: Subject to any disclaimer, the term of this patent is extended or adjusted under 35 U.S.C. 154(b) by 0 days.

(21) Appl. No.: 17/543,315

(22) Filed: Dec. 6, 2021

(65) Prior Publication Data

US 2022/0165078 A1 May 26, 2022

Related U.S. Application Data

(63) Continuation of application No. 16/668,716, filed on Oct. 30, 2019, now Pat. No. 11,195,008.

(51) Int. Cl.

| | |
|---|---|
| *G06V 30/414* | (2022.01) |
| *G06V 30/418* | (2022.01) |
| *G06V 30/416* | (2022.01) |
| *G06F 18/28* | (2023.01) |
| *G06V 30/19* | (2022.01) |
| *G06V 10/74* | (2022.01) |
| *G06V 30/10* | (2022.01) |

(52) U.S. Cl.
CPC ............ *G06V 30/414* (2022.01); *G06F 18/28* (2023.01); *G06V 10/761* (2022.01); *G06V 30/1914* (2022.01); *G06V 30/416* (2022.01); *G06V 30/418* (2022.01); *G06V 30/10* (2022.01)

(58) Field of Classification Search
CPC .. G06V 30/418; G06V 30/416; G06V 30/414; G06V 30/1914; G06V 30/10; G06V 10/761; G06K 9/6255; G06F 18/28
See application file for complete search history.

(56) References Cited

U.S. PATENT DOCUMENTS

| | | | |
|---|---|---|---|
| 6,456,738 B1 | 9/2002 | Tsukasa | |
| 11,195,008 B2 * | 12/2021 | Zhang | ................. G06V 30/418 |
| 2016/0092407 A1 | 3/2016 | Ball | |
| 2018/0032804 A1 | 2/2018 | Yellapragada et al. | |
| 2018/0068183 A1 * | 3/2018 | van Rotterdam | .... G06V 30/416 |
| 2019/0130024 A1 | 5/2019 | Burchfield et al. | |
| 2020/0074169 A1 | 3/2020 | Mukhopadhyay et al. | |

\* cited by examiner

*Primary Examiner* — Casey L Kretzer

(74) *Attorney, Agent, or Firm* — Shook, Hardy & Bacon L.L.P.

(57) ABSTRACT

Methods, systems, and computer storage media are provided for data extraction. A target document representation may be generated based on modified text of a target electronic document. A measure of similarity may be determined between the target document representation and a reference document representation, which may be based on modified text of a reference electronic document. Based on the measure of similarity, the reference document representation may be selected. An extraction model associated with the selected reference document representation can then be used to extract data from the target document.

20 Claims, 6 Drawing Sheets

FIG. 2

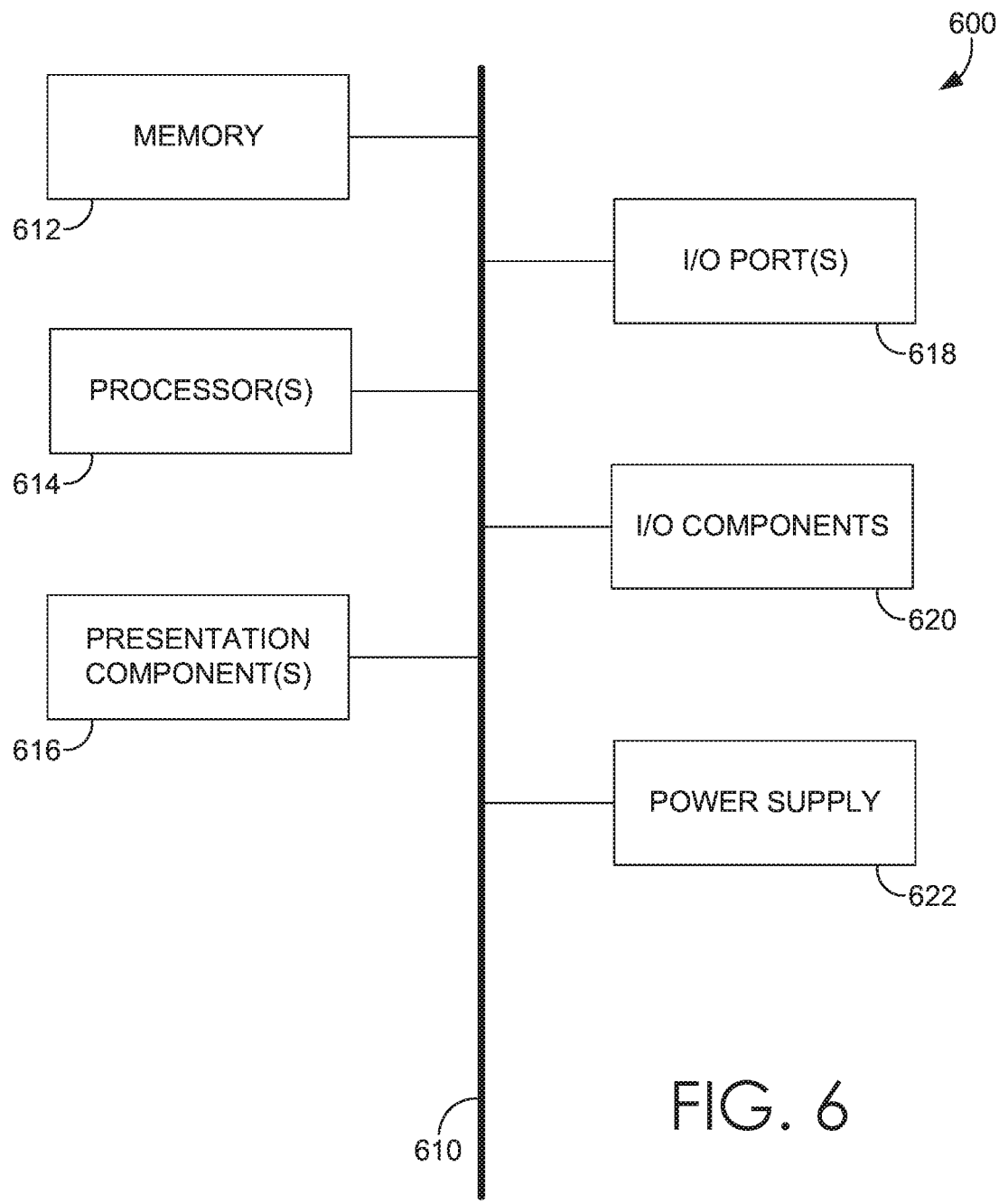

ELECTRONIC DOCUMENT DATA EXTRACTION

CROSS-REFERENCE TO RELATED APPLICATIONS

This application is a continuation of U.S. application Ser. No. 16/688,716, filed Oct. 30, 2019, entitled ELECTRONIC DOCUMENT DATA EXTRACTION, which is hereby incorporated by reference in its entirety.

BACKGROUND

Data extraction typically involves a computer detecting specific portions of an electronic document to extract the relevant data. For instance, if the electronic document is an invoice, a computer attempts to detect portions of the document that include an amount due, date in which it is due, or the vendor name and then extracts that data from the electronic document. Technical challenges often arise in extracting relevant data because electronic documents vary in form and content and image quality. Each electronic document is unique because there is no standardized format. The entity generating the document typically relies on its own selection of content (e.g., vendor names, terms and conditions, amount due, or due date), format of that content (e.g., words used to present the content), styles, or other features.

Conventional data extraction technologies typically rely on complicated machine learning classification models, such as a deep neural network, to identify and extract data from electronic documents. However, these models suffer from a high rate of inaccuracy, high false positive rates, and are highly dependent on large amounts of training data, which is often difficult to obtain based on the sheer number of unique characteristics (e.g., content, format, or styles) across different electronic documents. Additionally, these complicated models may require a large amount of computing resources to train or create.

SUMMARY

At a high level, aspects described herein relate to improvements in data extraction from documents. A data extraction system generates reference document representations from reference electronic documents by modifying a text portion of each reference electronic document. An extraction model is associated with each reference document representation. When a target electronic document is received for data extraction, the data extraction system generates a target document representation by modifying one or more portions of text of the target electronic document. After the target document representation is generated, it is compared to the reference document representations to identify a particular reference document representation. If a measure of similarity between the target document representation and a reference document representation satisfies a particular score or threshold, the extraction model associated with that reference document representation is used to extract relevant data from the target electronic document.

The data extraction system generates the document representations (for the reference electronic documents and target documents) by modifying a text portion in which the text is likely to be unique to a given document such that the text in that text portion varies across similar documents. Other text portions that are likely to be the same across similar documents are not modified. In some configurations, the text portions that are modified comprise certain predefined types of text, such as a phone number, name, address, currency, or account number (e.g., international Bank Account Number (IBAN) or Society of Worldwide Interbank Financial Telecommunication (SWIFT) code). For example, in the case of an invoice that is sent from a company to customers, the text on some portions of any given invoice may be the same or have the same format on all invoices, while the text in other portions, such as the customer name, is different on each invoice. Text may be modified by deleting the text and/or replacing the text with a standard text.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawings, wherein:

FIG. 2 is an example illustration of an electronic document, in accordance with aspects described herein;

FIG. 6 is a block diagram of an example computing environment suitable for use in implementing aspects described herein.

DETAILED DESCRIPTION

Figure 1:
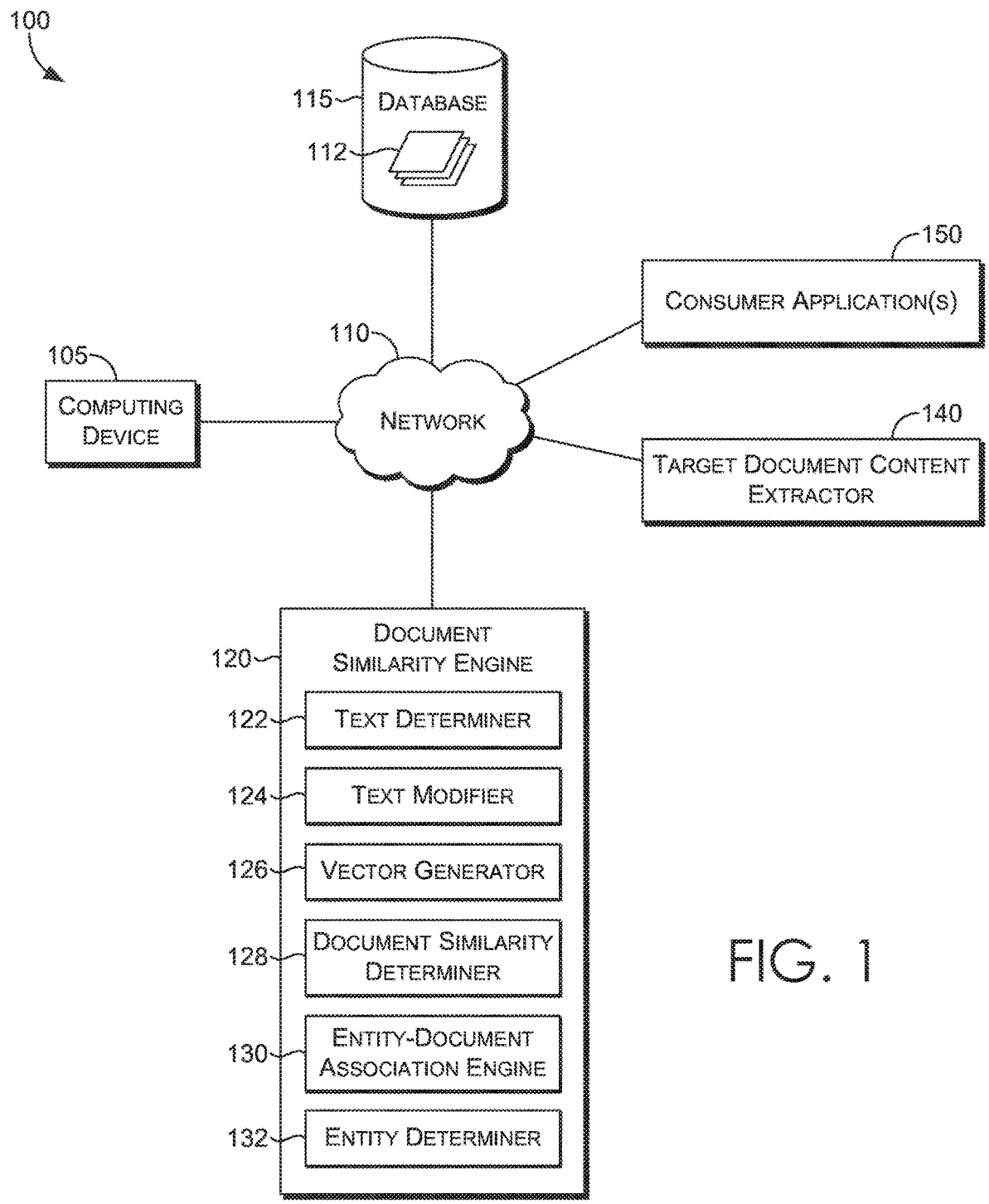
FIG. 1 is an example data storage and extraction system in which implementations of the present disclosure may be employed.

The present technology relates to methods, systems, and computer storage media for providing accurate data extraction from documents.

As will be described in further detail below, a data extraction system generates reference document representations from reference electronic documents by modifying a text portion of each reference electronic document. An extraction model is associated with each reference document representation. When a target electronic document is received for data extraction, the data extraction system generates a target document representation by modifying a text portion of the target electronic document. The data extraction system identifies a particular reference document representation based on a comparison of the target document representation with the reference document representation, and the extraction model associated with that reference document representation is used to extract data from the target electronic document.

Initially, the data extraction system generates reference document representations from a set of reference electronic documents. The data extraction system generates a reference document representation from a reference electronic document by analyzing the text of the reference electronic document and modifying one or more text portions while leaving the remaining text unmodified. More particularly, the data extraction system modifies a text portion in which the text is likely to be unique to a given document such that the text in that text portion varies across similar documents. Other text portions that are likely to be the same across similar documents are not modified. In some configurations, the text portions that are modified comprise certain predefined types of text, such as a phone number, name, address, or date. For example, in the case of an invoice that is sent from a company to customers, the text on some portions of the invoice is the same on all invoices, while the text in other portions, such as the customer name, is different on each invoice.

In some configurations, modifying a text portion in a reference electronic document comprises modifying the text in the text portion. Modifying the text may include removing the text and/or replacing it with standard text. The resulting modified text of the reference electronic document (which includes the modified text portion and the remaining unmodified text) can then be stored as a reference document representation. In some instances, the reference document representation comprises text and not images (e.g., graphs or pictures). This may be repeated for each reference electronic document from a set of reference electronic documents.

While in some configurations, a reference document representation is the modified text of a reference electronic document, in other configurations, a reference electronic document is a vector generated from the modified text. For example, one or more vectors may be generated based on the resulting modified text, including the text that has been modified and the remaining text that was not modified. A single vector may be generated based on the modified text, where the majority (if not all) of the modified text of the electronic document is associated with a single vector. Additionally or alternatively, a plurality of vectors may be used, where each vector is associated with different portions of the text. For example, each word or portion of words may be associated with a vector. Storing the reference document representations as one or more vectors may improve speed in which documents are compared. For instance, comparing vectors of a target document representation to a set of vectors for the reference electronic document representations may be quicker that comparing raw text. Additionally, storing the reference document representations as vectors may improve the security of data contained in the document. For instance, sensitive information in electronic documents may be preserved because the electronic document may be stored in association with a vector in a vector space as opposed to raw text. Without a decrypt key, it is difficult to decrypt the representation. This improves the security of the storage of electronic documents since storing the electronic document as raw text data may be more easily identifiable.

Each reference document representation is associated with one or more extraction models. Each extraction model is generally used to identify relevant data in a target electronic document whose document representation corresponds to a reference document representation. The extraction model may be used to identify particular types of data within the document (e.g., an amount due, a due date, a customer or company name, or contact information) and where that data is contained in the document. The extraction model can then extract the relevant portions data. The extraction model may be any set of rules, logic, or classification models, used identify the data within an electronic document. For instance, the extraction model may rely on absolute/relative coordinates, surrounding words, or other heuristics to determine which text is associated with relevant data.

After reference document representations are generated from the set of reference electronic documents, the data extraction system uses the reference document representations to extract data from target electronic documents. A target electronic document may be received, for example, from a client device. For instance, a physical document can be scanned utilizing a scanner or camera of a computing device, which then communicates the scanned image to the data extraction system to extract relevant data.

After receiving the target electronic document, the data extraction system generates a target document representation of the target electronic document and for comparison against one or more of the reference document representations. The generation of the target document representation from the target electronic document may be similar to generation of a reference document representation from a reference electronic document. More particularly, the target electronic document may be processed to identify and modify one or more text portions while leaving other text unmodified. The one or more text portions of the target electronic document that are modified generally include text that is likely to be unique to the target electronic document. The text of the target electronic document that is not modified generally includes text that is likely to be the same on similar documents. In some configurations, the one or more text portions that are modified comprise certain predefined types of text, such as a phone number, name, address, or date.

Modified text for target electronic document is generated by modifying the one or more identified text portions and leaving other portions of text unmodified. Modifying the text may include removing the text and/or replacing it with standard text. A target document representation is generated from the modified text. In some configurations, the target document representation comprises the modified text. In other configurations, the target document representation comprises a vector generated from the modified text.

The target document representation is compared to one or more of the reference document representations. In configurations in which the target document representation and reference document representations comprise modified text, the modified text of the target document representation is compared to the modified text associated with a reference document representation. In configurations in which the target document representation and reference document representation each comprise a vector, the vector of the target document representation is compared to the vector of a reference document representation.

A measure of similarity may be determined for the target document representation and one or more reference document representations. As described herein, the measure of the similarity may be determined based on a term frequency algorithm (e.g., TF-IDF) or a Jaccard Similarity Index. Additionally or alternatively, the measure of similarity may be determined based on a cosine similarity (such as a cosine similarity between the target vector(s) and the reference vector(s)). If the measure of similarity between the target document representation and a reference document representation satisfies a particular threshold, the extraction model associated with that reference document representation is used to extract relevant data from the target electronic document. For instance, the absolute/relative coordinates, surrounding words, or other heuristics of the extraction model can be used to determine which text in the target electronic document is associated with relevant data and, thus, extracted.

The described technology is superior to and improves upon conventional methods for data extraction. For example, conventionally, the technical problem for text and image recognition is solved using deep neural networks with millions of parameters involved. However, this requires large amounts of training data and time to train the model. Even more, despite the deep neural networks using millions of parameters, it still suffers from high rates of inaccuracy. These neural networks also require a large amount of computational resources and time to execute, which increases the amount of time and processing power the computer uses to extract relevant data. As such, improvements are needed.

By utilizing the technological solutions described herein, higher accuracy rates can be achieved while reducing the amount of training data and preserving computational resources (e.g., processing power and time). In preliminary testing, the technological solutions described herein were used to extract relevant content from a group of financial documents (e.g., invoices). Aspects achieved a high accuracy rate of 97.12%, a low false positive rate (less than 1%), and a quick response rate (about 0.4 seconds/electronic document).

It should be appreciated that many of the aspects described herein refer to a financial document, such as an invoice. As used herein, a financial document or invoice is meant to be interpreted broadly and may be interpreted to mean a bill, statement, account summary, statement of charges, receipt, or the like. The invoice may comprise a list of goods or services provided and an amount due for the provided good or service.

One skilled in the art would recognize that the technology described herein is not limited to such documents. The electronic document may be associated with any type of document, such as records, certificates, memos, reports, or tickets. The present technology may be applied across multiple industries. It would be impossible or impractical to describe the technology with respect to each different industry.

Turning now to FIG. 1, a block diagram is provided showing a data extraction system 100 in which implementations of the present disclosure may be employed. In particular, FIG. 1 illustrates a high level architecture of data extraction system 100 having components in accordance with implementations of the present disclosure. The components and architecture of FIG. 1 are intended as examples.

Any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. The functionality of data extraction system 100 can be further described based on the functionality and features of the listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Among other components or engines not shown, data extraction system 100 includes computing device 105. Computing device 105 is shown communicating using network 110 to document similarity engine 120, target document content extractor 140, consumer application(s) 150, and database 115. The components of data extraction system 100 may communicate with each other over one or more networks (e.g., public network or virtual private network "VPN") as shown with network 110. Network 110 may include, without limitation, one or more local area networks (LANs), wide area networks (WANs), or any other communication network or method. Computing device 105 may be a client computing device that corresponds to the computing device described herein with reference to FIG. 6.

Data extraction system 100 also includes a database 115. Database 115 generally stores information including data, computer instructions (e.g., software program instructions, routines, or services), a set of reference document representations 112 (as described in greater detail below), or models used in embodiments of the described technologies. Although depicted as a database component, database 115 may be embodied as one or more data stores or may be in the cloud.

Data extraction system 100 comprises a document similarity engine 120. At a high level, document similarity engine 120 may generate a set of reference document representations 112 (also referred to a set of reference electronic documents). Document similarity engine 120 may also generate a target document representation. It may then determine whether a target document representation is similar to a reference document representation. Document similarity engine 120 may then communicate with the target document data extractor 140 to extract content from the target electronic document.

For instance, after a set of reference document representations 112 has been generated, document similarity engine 120 may receive a target electronic document over the network 110 from computing device 105. The electronic document may be in any file format. In some aspects, the electronic document is a PDF document or an image document. Computing device 105 may utilize a software application to generate the electronic document using a camera or scanner, or other I/O components (e.g., I/O components 620 of FIG. 6). In some aspects, software instructions receive an indication from a user that causes the computing device 105 to scan a physical document containing text that is going to be extracted and stored electronically. The software instructions may then cause the computing device 105 to communicate the electronic document to the document similarity engine 120. In some aspects, software instructions cause the computing device to capture an image of a physical financial document (e.g., an invoice) or any other documents having text that the user wishes to electronically extract. Document similarity engine 120 may then determine which (if any) reference document representations corresponds to the target document representation. Based on selecting a reference document, document similarity engine 120 may then communicate its determinations to other components of the data extraction system 100, such as the target document content extractor 140, which can then extract content from the target document (as described in greater detail below).

Document similarity engine 120 includes a text determiner 122. Text determiner 122 generally receives the electronic document and determines text of the electronic document. Text determiner 122 may receive an electronic document, such as an image document (e.g., a PDF document), and then determines text contained within the electronic document.

In some aspects, text determiner 122 may determine text within the electronic document through an optical character recognition ("OCR") engine. For example, in aspects where the electronic document is an image document that has not been pre-processed, the text determiner 122 processes the electronic document so as to determine text contained within the electronic document. Text determiner 122 may utilize an OCR engine to convert the image document into a document having machine-encoded text and determine the text contained within the electronic document. In some aspects, the text determiner 122 may disregard graphs, pictures, or other images in determining the text of the electronic document.

In some aspects, text determiner 122 may first prepare the electronic document by enhancing the image quality of the electronic document through a grayscale conversion, desaturation, brightness correction, contrast correction, and other similar image quality functions. Text determiner 122 may also deskew the electronic document to generate a uniform orientation and process the electronic document utilizing a Fourier transformation or a Gaussian function to remove background noise. Text determiner 122 may then generate machine-encoded text through an OCR engine. It should be appreciated that the electronic document may have already been preprocessed and comprises machine-encoded text. In such aspects, text determiner 122 does not need to generate machine-encoded text and may determine the text from the pre-processed document.

Figure 2:
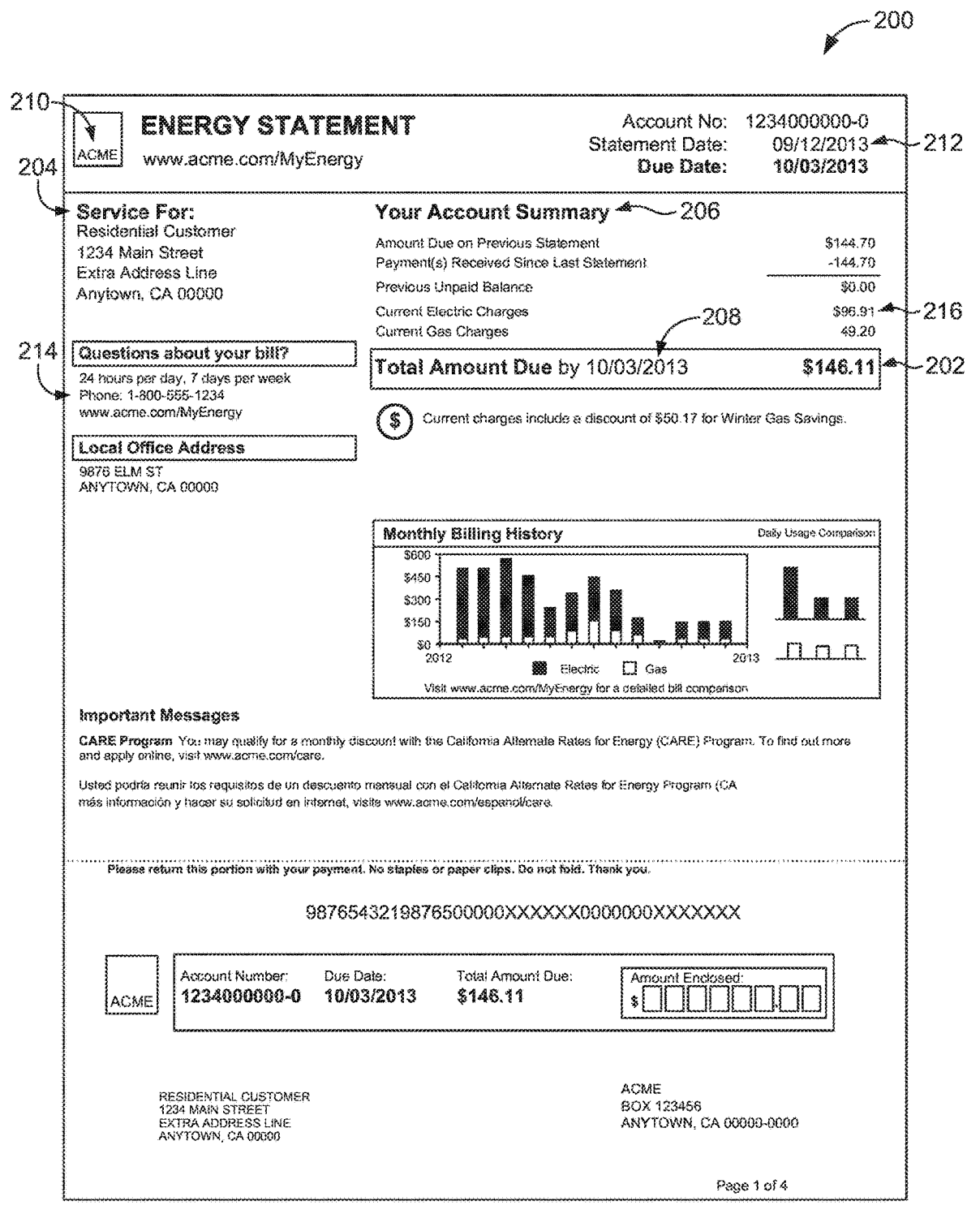

By way of example, the computing device 105 may communicate a scanned image of a physical document (e.g., a financial document, such as financial document 200 shown in FIG. 2) to document similarity engine 120. If the scanned image comprises machine-encoded text, text determiner 122 may extract the text of the scanned image, such as a customer address, an amount due, a payment date, terms and conditions, vendor name/address, terms and conditions, or other text of the document. If the scanned image does not comprise machine-encoded text, text determiner 122 may preprocess the scanned image so as to determine the text contained within the electronic document, as described herein.

Text determiner 122 may then output the text. Text determiner 122 may output the text in any format. In some aspects, text determiner 122 outputs the text in a JavaScript Object Notation (JSON) or an Extensible Markup Language (XML) format. The extracted text may then be communicated to the other components of data extraction system 100. In some aspects, text determiner 122 may store the text in database 115 or communicate the text to text modifier 124. In some aspects, the text determiner 122 does not extract images, such as graphs or pictures. As such the text that is output by the text determiner 122 may comprise alphanumeric text and not images.

Document similarity engine 120 includes text modifier 124. At a high level, text modifier 124 identifies predefined types of text and modifies a particular portion of text associated with the predefined type of text. Text modifier 124 may thus modify specific portions of text while leaving other portions of the text unmodified. Accordingly, text modifier 124 may alter the text that was originally included in the electronic document.

Text modifier 124 may receive text from text determiner 122 or communicate with the database 115 to access the text. Text modifier 124 may then analyze the text to identify a predefined type of text. The predefined type of text may be text that is likely to be specific to that particular document. For example, in instances where the electronic document is associated with a financial document (e.g., an invoice), the predefined type of text may be text associated with customer or financial information. By way of example, the predefined type of text may comprise a due date, an amount due, the invoice recipient's contact information (e.g., an address, a phone number, and an e-mail address), a date of the invoice, or other personal or financial information. Referring to financial document 200 of FIG. 2, the predefined type of text may comprise a total amount due 202, a customer's address 204, a due date 208, an invoice date 212, or charges 216.

It should be appreciated that the predefined type of text may associated with text that is typically included across multiple documents, but which is formatted, positioned, or worded differently between each document. For example, if the document is a financial document (e.g., an invoice), the predefined type of text may be associated with an amount due or a due date, but the text associated with the predefined type of text (e.g., $104.24 is due Oct. 25, 2019) may be specific to that particular document. In this way, the text associated with predefined type of text may be specific to a single instance of the electronic document while the predefined type of text may be applicable across a group of electronic documents.

Text modifier 124 may rely on a set of logic, rules, conditions, associations, or classification models, which may include one or more machine learning (ML) classification models, or other criteria, to determine whether the text of a document is associated with a predefined type of text. For example, in some aspects, text modifier 124 utilizes a set of logic, rules, conditions, associations, or classification models to parse the text associated with the document in order to detect a predefined type of text. The predefined type of text may be associated with personal information and/or financial information. By way of example, predefined type of text may be associated with personal information of an invoice recipient or financial information that is specific to that particular an invoice, such as an invoice recipient's name or contact information (e.g., an address, a phone number, an e-mail), an amount due, a date of the invoice, a due date, a previous balance(s), or other information that is specific to that particular instance of the document. In some aspects, text modifier 124 utilizes static rules, Boolean logic, fuzzy logic, or may comprise one or more statistical classification models such as logistic regression, Naïve Bayes, decision tree, random forest, support vector machine, neural network, finite state machine, clustering, other machine learning techniques or similar statistical classification processes, or other rules, conditions, associations, or combinations of these classification techniques to detect predefined types of text.

In some aspects, the set of logic, rules, conditions, associations, or classification models may utilize a predefined term(s), a format of the text, symbols, numeric text, context of the text (e.g., surrounding text, headers, or spatial orientation) to identify predefined types of text. For example, a portion of text in an electronic document may include 'Bill To: John Smith'. The set of logic, rules, conditions, associations, or classification models may be utilized to identify the predefined terms of 'Bill To' to determine that following text field (i.e., 'John Smith') is associated with an invoice recipient name.

As described, the set of logic, rules, conditions, associations, or classification models may rely on the format of the text or symbols. The format of the text may include a format that is indicative of personal or financial information, such as an amount due, a date, or an address. In some aspects, the set of logic, rules, conditions, associations, or classification models may rely on a currency symbol (e.g., '$') followed by numbers to determine that the text is associated with a dollar amount. Referring to reference number 202 in FIG. 2, for example, an electronic document may include the text 'Total Amount Due' and '$146.11'. Text modifier 124 may employ the set of logic, rules, conditions, associations, or classification models to identify the dollar symbol and the text format (e.g., XXX.XX) to determine that '$146.11' relates to a dollar amount. In some aspects the set of logic, rules, conditions, associations, or classification models may further rely on the term 'total due' preceding the '$146.11' to determine that '146.11' relates to an amount due. As such, text modifier 124 can determine that '146.11' is a portion of text associated with an amount due. Similarly, text modifier 124 may employ the set of logic, rules, conditions, associations, or classification models to identify the format of XX/XX/XXXX or a month, data, year (e.g., Mar. 1, 2019) as a date.

As mentioned, the set of logic, rules, conditions, associations, or classification models may rely on the context of the text to identify or determine a predefined portion of text or text field. Referring to customer's address 204 in FIG. 2, for example, the set of logic, rules, conditions, associations, or classification models may identify the header of 'Service For:' as indicating that the text field below the header (here, a customer address text field of 'Residential Customer, 1234 Main Street Extra Address Line, Anytown, Calif. 0000') as an invoice recipient address. Similarly, referring to reference number 206, the header of 'Your Account Summary' may indicate that the text field below the header is associated with a balance or charge text field.

Text modifier 124 may modify one or more portions of text associated with the electronic document. For instance, text modifier 124 may modify the text associated with the predefined type of text. In some aspects, text modifier 124 may modify the predefined portion of text by removing (e.g., deleting) the text. For instance, text modifier 124 may delete the invoice recipient address of 'Residential Customer, 1234 Main Street Extra Address Line, Anytown, Calif. 0000' that was previously included in the text.

In some aspects, text modifier 124 may modify the text by removing the text and inserting standard text. For instance, text modifier 124 may delete a portion of the text that is determined from the electronic document (e.g., the predefined portion of text) and add standard text in its place. In some aspects, the standard text is generic text that is added across a plurality of electronic documents (e.g., target electronic documents or reference electronic documents). For example, the standard text may be generic customer information or generic financial information.

Referring to FIG. 2, text modifier 124 may delete a recipient's name and address that has been determined from a digital invoice, such 'Residential Customer, 1234 Main Street Extra Address Line, Anytown, Calif. 0000' and add generic text of 'Customer, 1234 Street, City, AA 00000.' In example aspects, the standard text is at least one of a standard due date, a standard amount due, a standard invoice recipient's name or standard contact information (e.g., a standard address, a standard phone number, or a standard e-mail address), a standard date of the invoice, or a standard previous balance(s). In this way, text modifier 124 can generate modified text by deleting the text and replacing the text with standard text.

It should be appreciated that by determining which portions of text need to be modified, the text modifier 124 may also determine which portions of text will remain unchanged. That is, text modifier 124 may determine what text associated with the electronic document should not be altered. In some aspects, the text modifier 124 may determine that a portion of the text corresponds to information associated with the entity that generated the document. For example, if the electronic document is an invoice, the text modifier 124 may determine that a particular address is associated with the vendor and not the customer. Similarly, the text modifier may determine that contact information may be associated with the vendor as opposed to the customer.

In some aspects, text modifier 124 may rely on user input to identify the portion of text that is to be modified. This may be beneficial if the set of logic, rules, conditions, associations, or classification models are not available for that particular document (e.g., a new document that the text modifier 124 has not previously processed). For example, text modifier 124 may prompt a user, via a user interface, to identify a portion of text that corresponds to personal or financial information, such as a due date, an amount due, an invoice recipient's name or contact information (e.g., an address, a phone number, an e-mail), a date of the invoice, a previous balance(s), or other information that is specific to that particular instance of the document.

In some aspects, the text modifier 124 may use this input to determine characteristics of the portions of text identified by the user. These characteristics can then be used identify similar portions of text in future documents. For example, upon receiving user input, the text modifier 124 may determine a set of logic, rules, conditions, associations, or classification models (e.g., automatically, such as through machine learning, or manually through manual input) based on the characteristics of the identified portion of text to identify predefined portions of text in future documents. Example characteristics include a predefined term(s), a format of the text, symbols, numeric text, or context of the text associated with the portion of text identified by the user.

In some aspects, the set of logic, rules, conditions, associations, or classification models may be determined by comparing two different documents. For example, an invoice from one entity can be compared to another invoice from that same entity to determine which portions of text are different between invoices. Based on the changes between documents, the set of logic, rules, conditions, associations, or classification models may be developed or refined to locate the portion of text in future documents. It should be appreciated that not all differences between documents from a single entity should be identified as portions of text that should be modified. For example, in aspects where the document is an invoice, a single entity may have different content or formats for any given invoice. Additionally or alternatively, not all differences between the documents from a single entity may be identified as portions of text that should be modified. For example, if the document is an invoice issued by a company to a customer, the company may issue multiple invoices to different customers having different customer account numbers, but the customer account number may not be modified as it may be useful when comparing to document representations.

Text modifier 124 may then generate a representation of the electronic document based on the modified text. Additionally or alternatively, text modifier 124 my output the modified text to other components of FIG. 1. In some aspects, text modifier 124 may communicate the modified text to vector generator 126.

Referring still to FIG. 1, document similarity engine 120 comprises vector generator 126. At a high level, vector generator 126 generates one or more vectors based on the modified text. For instance, vector generator 126 may receive modified text from text modifier 124 or database 115 and generate one or more vectors representing the modified text and/or the portion of text that has been unmodified. In some aspects, a vector may be a collection or a list of encrypted strings, floats or hash codes that represent the text of the electronic document. It should be appreciated that, among other improvements, generating a vector of the modified text may improve the security of storing the text (e.g., the text of the set of reference documents) since the content of the electronic document would not be discernable.

In some instances, vector generator 126 may generate a single vector based on the modified text. For example, a single vector can represent the words associated with the modified text discussed above. In other instances, vector generator 126 may generate a plurality of vectors that are based on portions of the modified text. For example, a single vector can represent a single word in an electronic document such that the document is represented by a plurality of vectors as opposed to one vector. It should be appreciated that vector generator 126 may utilize a vector space model to generate a vector. The vector space model may be any algebraic model for representing text as one or more vectors.

Vector generator 126 may then output one or more vectors representing one or more portions of the modified text associated with the electronic document to the components of data extraction system 100. In some aspects, vector generator 126 may communicate the one or more vectors to document similarity determiner 128. In some aspects, vector generator 126 may cause the one or more vectors to be stored in database 115.

It should be appreciated that text determiner 122, text modifier 124, or vector generator 126 may be used to generate a set of reference document representations 112 that are stored in database 115. Each reference document representations of the reference document representations 112 may be stored as text data or one or more vectors. As discussed, each electronic documents of the set of reference document representations 112 may vary in text (e.g., terms, words, numbers, and symbols) or format (e.g., location of terms within the document, structure, and overall organization). For instance, a first reference electronic document may have a different format or text than the format or text of a second reference electronic document. The set of reference document representations 112 may be used to compare to future document representations. In instances where the electronic document is associated with an invoice, each of the reference document representations 112 may be associated with different vendors or different invoices from the same vendor.

As described, the text and format of financial documents may vary greatly. For example, financial documents often use different terms and formats to communicate a reference number (e.g., an invoice number); dates of the invoice; credit terms; penalties; tax amounts; name and contact details of the seller/vendor; name and contact details of the invoice recipient; date that the good or service was sent or delivered; purchase order number (or similar tracking numbers requested by the buyer to be mentioned on the invoice); description of the product(s); unit price(s) of the product(s); total amount charged; or payment terms (including one or more acceptable methods of payment, date the payment is expected, and details about charges for late payments, e.g., payments made after this date).

For example, an invoice from Acme Print Co. may include different text than the text included in an invoice from Superfast Cable Co., which are both different than the text included in an invoice from Your Local Utility Co. This may be because each entity's invoice includes a different set of terms and conditions, explanation of charges, information about the entity, or entity contact information, for example. Even more, each entity may have a different invoice for different goods or services they provide. For example, Acme Print Co.'s invoice for printer cartridges may be different than Acme Print Co.'s invoice for printing paper. These differences in terms and formats present technical challenges for computers to determine what data should be extracted from the electronic document.

The set of reference document representations 112 that is stored in database 115 may be compared to a target document representation. Continuing with the example above, document similarity engine 120 may receive electronic documents associated with an invoice from Acme Print Co., an invoice from Superfast Cable Co., and an invoice from Your Local Utility Co. Text determiner 122, text modifier 124, or vector generator 126 (described in greater detail below) may be used to generate reference document representations 112 that are then used to compare to a representation of a newly received target electronic document, which will be described in greater detail with reference to the document similarity determiner 128. It should be appreciated that in aspects that utilize vector generator 126, the reference document representations 112 may be stored as one or more reference vectors. In aspects that do not utilize vector generator 126, the reference document representations 112 may be stored in any manner, such as in text form.

Document similarity engine 120 comprises document similarity determiner 128. Generally, document similarity determiner 128 determines whether a target document representation is similar to a reference document representation. For example, document similarity engine 120 may receive a representation of a reference electronic document and a representation of a target electronic document modified text and determine a measure of similarity. If the measure of similarity satisfies a particular similarity score, the document similarity determiner 128 may communicate this determination to other components of FIG. 1.

In some aspects, document similarity determiner 128 may determine a measure of similarity between a reference electronic document and a target electronic document based on a representation of text. In such aspects, the document similarity determiner 128 determine a similarity score between modified text of a target electronic document (which may be received from text modifier 124) with the modified text of a reference electronic document (which may be previously stored in the database 115 by text modifier 124). For example, document similarity determiner 128 may compare the text from a target document representation (e.g., a modified portion of text and the unmodified portion of text) to the text of a reference document representation (e.g., a modified portion of text and an unmodified portion of text).

By way of example, in one aspect, document similarity determiner 128 utilizes a Jaccard Similarity Index to determine a similarity between the representations of text. Based on satisfying a predetermined similarity score, document similarity determiner 128 may determine that the target document representation is similar to a reference document representation. Additionally or alternatively, document similarity determiner 128 may determine that the reference document representation having a highest Jaccard Similarity score as being similar to the target document representation.

As a further example, in another aspect, document similarity determiner 128 may utilize a term frequency or a term frequency-inverse document frequency (TF-IDF) algorithm to determine a similarity between the text of the target document representation and the text of the reference electronic document representation. For instance, document similarity determiner 128 may utilize a term frequency determination to determine if a target document representation (e.g., a modified portion of text and unmodified portion of text) is similar to the text of a reference document representation (e.g., a modified portion of text and an unmodified portion of text). Based on satisfying a predetermined similarity score, document similarity determiner 128 may determine that the target document representation is similar to a reference document representation. Additionally or alternatively, document similarity determiner 128 may determine the reference document representation having a highest similarity score as being similar to the target document representation.

As mentioned, the target document representation and reference document representation may each comprise one or more vectors. As described, vector generator 126 may generate a vector based on the modified text output by text modifier 124. Vector generator 126 may then generate a target document representation in the form of one or more target vectors based on the modified portion of text and the unmodified portion of text of the target electronic document. In a similar manner, vector generator 126 may generate a reference document representation in the form of one or more reference vectors.

The document similarity determiner 128 may then determine a similarity between the one or more target vectors and the one or more reference vectors. To determine similarity between vectors, document similarity determiner 128 may utilize a Jaccard Similarity Index, TF-IDF, a cosine similarity function, word embedding algorithms, or other similarity algorithms. For example, document similarity determiner 128 may utilize a cosine similarity function to determine a measure of similarity between two or more vectors in the vector space. Example cosine similarity functions include an Euclidean dot product, angular and distance similarity, Tanimoto coefficient, or Otsuka-Ochiai coefficient.

In example aspects, document similarity determiner 128 utilizes an Euclidean dot product function to determine the similarity between a target vector and a reference vector. The Euclidean dot product may be determined based on the following formula where A is associated with the reference document representation and B is based on the target document representation.

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \, \sqrt{\sum_{i=1}^{n} B_i^2}}$$

In some aspects, document similarity determiner 128 utilizes a customized cosine similarity function or a standard cosine similarity based on a comparison of the magnitudes of each vector. In instances where a Euclidean dot product function is utilized, document similarity determiner 128 may utilize the standard Euclidean dot product function or a customized Euclidean dot product function based on comparing the magnitude of target vector with the magnitude of the reference vector. The magnitude of a vector can be determined based on a function of the norm of the vector. For instance, the magnitude of a vector in a Euclidean vector space may be determined based on the following.

$$\|x\| := \sqrt{x_1^2 + x_2^2 + \ldots + x_n^2}$$

Continuing, if the function of the norm of the target vector is larger than the function of the norm of the reference vector, then document similarity determiner 128 may utilize a customized cosine similarity function by modifying the denominator of the Euclidean dot product formula. For example, if $\|B\|$ is larger than HAIL then $\|B\|$ is replaced with $\|A\|$. Thus, the customized cosine similarity function may be the following.

$$\text{similarity} = \cos(\theta) = \frac{A \cdot B}{\|A\| \, \|A\|} = \frac{\sum_{i=1}^{n} A_i B_i}{\sqrt{\sum_{i=1}^{n} A_i^2} \, \sqrt{\sum_{i=1}^{n} A_i^2}}$$

By determining whether to utilize a standard cosine similarity function or a customized cosine similarity function, document similarity determiner 128 can weigh the shared portion between the vectors higher, which avoids diluting the non-shared portions when the target vector has a greater magnitude than the reference vector. This may improve the accuracy of determining which reference vector is similar to the target vector, which can provide higher accuracy rates and lower false positive rates.

With reference still to document similarity determiner 128, document similarity determiner 128 may initially utilize a user account index of reference document representations and then a global index of reference document representations. For example, a particular user may have one or more reference document representations associated with a user account. For example, these may be reference document representations that have been similar to the user's target document representations in the past. In some aspects, a past target document representation may be used as reference document representation, thereby expanding the reference document representations.

Document similarity determiner 128 may first determine a measure of similarity between a newly received target document representation and the one or more user account reference document representations. If the measure of similarity does not satisfy a particular threshold or score, document similarity determiner 128 may then use the global index. For instance, document similarity determiner 128 may determine a measure of similarity between the target document representation and a global index reference document representation.

By way of example, if a user's account comprises a representation of an Acme Print Co. and a representation of a Superfast Cable Co. invoice, document similarity determiner 128 may determine a measure of similarity between representation of a Your Local Utility Co. invoice and the Acme Print Co. invoice representation and the Superfast Cable Co. invoice representation. Based on the differences in the document representations (e.g., the different invoices have different terms and conditions), document similarity determiner 128 may determine that the measure of similarity does not satisfy a threshold or score. As such, document similarity determiner 128 may then utilize a global index of electronic reference documents to determine that the Your Local Utility Co. invoice representation is similar to Your Local Utility Co. invoice representation that has been uploaded by another user. As such, in some aspects, the global index of reference electronic documents may comprise representations of electronic documents that were uploaded by other users.

In some aspects, document similarity determiner 128 may update reference document representation. The document similarity determiner 128 may receive a confirmation that a particular reference document representation is similar to a target document representation. For example, the document similarity determiner 128 may receive an indication from a consumer application(s) 150 or target document content extractor 140 that a user has approved of the extracted data from the target document. Based on receiving a confirmation, document similarity determiner 128 may store an indication that the reference document representation corresponds to the target document.

In response to receiving the confirmation, the document similarity determiner 128 may determine to store the target document representation as a reference document representation within the set of reference document representations 112. Additionally or alternatively, the p reference document representation may be updated (or replaced) with the target reference document. For instance, the document similarity determiner 128 may determine that an AT&T reference document representation from July 2018 satisfies a particular similarity score when compared to an AT&T target document representation from October 2019. If the document similarity determiner 128 receives an indication that the AT&T target reference document from October 2019 corresponds to the AT&T reference document representation from July 2018 (e.g., document similarity determiner 128 may receive an indication that a user has confirmed or accepted the data extracted from an AT&T electronic document from October 2019), the AT&T reference document representation from July 2018 may be updated with AT&T target document representation from October 2019. It should be appreciated that this may ensure that the set of reference document representations 112 are associated with the most current electronic documents.

Document similarity determiner 128 can output to the components of data extraction system 100 a determination of whether a target document representation is similar to a reference document representation. In some aspects, the document similarity determiner 128 stores its determination in database 115 or communicates its determination to target document content extractor 140. It should be appreciated that the document similarity determiner 128 may offer improvements over conventional technology by determining which reference electronic documents are most similar to target electronic documents based on modified text of an electronic document.

Document similarity engine 120 may also comprise entity-document association engine 130. In general, entity-document association engine 130 stores an indication that a document representation is associated with a particular entity, such as a particular name and/or name of an organization. The entity may be a business or a person that has generated or provided the data contained within the electronic document. For instance, in aspects where the electronic document is an invoice, entity-document association engine 130 may store an indication that a particular invoice representation is associated with an entity issuing the invoice (e.g., UPS®, Sprint®, or Comcast®). In some aspects, the indication may be utilized to determine whether to group a set of invoices according to a particular entity. Additionally or alternatively, the indication may be used in determining that a target document representation is similar to a reference document representation (which is described in greater detail in reference to entity determiner 132). For example, the indication may be used as a sanity check to determine whether the target document representation corresponds to a reference document representation.

In some aspects, entity-document association engine 130 may store an indication that a reference document representation within the set of reference document representations 112 is associated with a particular entity. For instance, each reference document representation within the set of reference document representations may be designated as being associated with a particular entity by a user or an administrator. For example, a first reference document representation may be associated with the entity Sprint® while a second reference document representation may be associated with the entity UPS®.

Additionally, entity-document association engine 130 may store an indication that a reference document representation within the set of reference document representations 112 is associated with a specific aspect or facet of a particular entity. The specific aspect or facet may be a specific business unit, service, good, or other different characteristics associated with the same entity. For example, entity-document association engine 130 may store and indication that a first invoice is associated with UPS Air Freight Services and a second invoice in association with UPS Parcel Delivery Service.

In some aspects, entity-document association engine 130 utilizes input from a user. For example, entity-document association engine 130 may receive input through a graphical user interface regarding the entity associated with the electronic document. The indication of the entity may then be stored in association with the representation of the electronic document.

In some aspects, entity-document association engine 130 utilizes a set of logic, rules, conditions, associations, or classification models, which may include one or more ML classification models, or other criteria, to determine an association between the electronic document and the entity. For example, in some aspects, the set of logic, rules, conditions, associations, or classification models utilizes a list of entities or information about the entities (e.g., address, contact information, website) to determine whether the electronic document is associated with a particular entity. In some aspects, target document data extractor 140 utilizes static rules, Boolean logic, fuzzy logic, or may comprise one or more statistical classification models such as logistic regression, Naïve Bayes, decision tree, random forest, support vector machine, neural network, finite state machine, clustering, other machine learning techniques or similar statistical classification processes, or other rules, conditions, associations, or combinations of these classification techniques to determine whether the electronic document is associated with a particular entity.

Referring to FIG. 2, for example, the electronic document may be determined to be associated with Acme based on user input and/or the set of logic, rules, conditions, associations, or classification models. In some aspects, user input may be received based on the user providing input that a payment should be issued to that particular entity. Based on determining that the electronic document is associated with Acme, the entity-document association engine 130 may store an indication that the electronic document (or a representation of the electronic document) is associated with the entity Acme. It should be appreciated that entity-document association engine 130 may store the indication in the database 115 and/or communicate the indication to other components of data extraction system 100.

Document similarity engine 120 also comprises entity determiner 132. At a high level, entity determiner 132 may determine whether a target document representation is associated with the same entity as the reference document representation. In some aspects, this determination is made in addition to the determination made by document similarity determiner 128. This determination may occur before or after the document similarity determiner 128 determines a measure of similarity between two or more representations of electronic documents.

In some aspects, entity determiner 132 communicates with document similarity determiner 128 to receive a determination that one or more potential reference document representations are similar to the target electronic document. For instance, entity determiner 132 may receive a determination that ten potential reference document representations are similar to the target document representation. Entity determiner 132 may then retrieve the entity or entities associated with the potential reference document representations and/or the target document representation (e.g., by communicating with entity-document association engine 130) to determine whether the target document representation is associated with the same entity as the potential reference document representations.

In instances where entity determiner 132 does not receive an indication that the target document representation is associated with a particular entity (e.g., from entity-document association engine 130), entity determiner 132 may analyze the target document (or the representation of the target document) to determine if the target document is associated with the same entity as the entity associated with reference document representation(s). In some aspects, entity determiner 132 parses the text of the target electronic document for an indication that it is associated with the same entity that is associated with the reference document(s). For instance, entity determiner 132 may determine whether the name of the entity is found within the modified text of the electronic document.

It should be appreciated that, in some aspects, entity determiner 132 may act as a verification of one or more potential reference document representations selected by the document similarity determiner 128. For instance, based on receiving a determination that one or more reference document representations satisfy a similarity score or threshold, entity determiner 132 may verify that the one or more reference document representations are associated with the same entity as the target document representation. If a reference document representation does not correspond to the same entity, it may be removed from further consideration (e.g., may be deselected). If entity determiner 132 determines that a reference document representation is associated with the same entity as the target document representation, entity determiner 132 may verify that the reference document representation corresponds to the target document representation.

Entity determiner 132 may communicate its determinations to the other components of data extraction system 100. For example, it may communicate its determination that the reference document representation corresponds to the target document to content extractor 140 and/or database 115.

Referring still to FIG. 1, data extraction system 100 comprises target document data extractor 140. At a high level, target document data extractor 140 extracts data from the target electronic document. For instance, the target document data extractor 140 can determine which portions of text associated with the target electronic document can be ignored and which portions of text should be extracted. In this way, target document data extractor 140 can automatically extract data from an electronic document.

Target document data extractor 140 may receive, from document similarity determiner 128, a determination that a target document representation is similar to a reference document representation. The target document data extractor 140 may then use an extraction model that is associated with the reference document representation to identify one or more particular types of data contained in the document and extract data from the target electronic document. It should be appreciated that each reference document representation may correspond to a particular extraction model(s) that identifies a particular type of data within the target document and/or determines where the data is located within the particular electronic document. For example, an extraction model may identify where an amount due or a due date is located in a particular electronic document (or representation thereof). It should be appreciated that this is not intended to mean that a single extraction model is used for each reference document (or each reference document representation), because in some aspects a single extraction model is capable of identifying the data for a plurality of reference electronic documents. Rather, it is intended to mean that because there may be hundreds of thousands of reference document representations, there may be specific extraction models associated with specific reference document representations within the set of reference document representations.

The extraction model(s) may be a set of logic, rules, conditions, associations, or classification models, which may include one or more ML classification models, or other criteria, to identify where the data is located within the document. For example, in some aspects, the set of logic, rules, conditions, associations, or classification models utilize absolute coordinates, relative coordinates, or surrounding words to identify a location of the data contained in the document. In some aspects, target document data extractor 140 utilizes static rules, Boolean logic, fuzzy logic, or may comprise one or more statistical classification models such as logistic regression, Naïve Bayes, decision tree, random forest, support vector machine, neural network, finite state machine, clustering, other machine learning techniques or similar statistical classification processes, or other rules, conditions, associations, or combinations of these classification techniques to identify location of the data contained in the document.

For example, a first extraction model may identify a first set of locations (e.g., positions) for data while a second extraction model may identify a different set of locations (e.g., positions) for data. As a further example, in instances where the document representations are associated with a financial document (e.g., an invoice), an amount due may be located on different pages of an invoice, have different spacing between the amount due and the actual dollar amount (e.g., $304.56), or may be oriented above, below, or beside the text indicating the amount due. Even more, the amount due may be presented in different semantics, syntax, or terms. For instance, the first reference document representation may indicate an amount due using the text 'Amount Due by Nov. 5, 2019' while the second reference document representation may indicate an amount due using the text 'Total'.

Continuing, if target document data extractor 140 receives a determination from document similarity determiner 128 that a target document representation is similar to the first reference document representation, target document data extractor 140 may utilize the extraction model associated with the first reference document representation to extract the content from the target electronic document. By way of example, target document data extractor 140 may utilize the terms 'Amount Due by Nov. 5, 2019', surrounding words, spacing, and/or orientation that is determined based on the first reference electronic document (or representation thereof) to determine and/or extract the actual dollar amount (e.g., $304.56) from the text of the target electronic document. Alternatively, if target document data extractor 140 receives a determination from document similarity determiner 128 that the target document representation is similar to a second reference document representation, target document data extractor 140 may utilize a second extraction model that is associated with the second reference document representation to extract data from the target electronic document. For instance, the target document data extractor 140 may utilize the terms 'Total', surrounding words, spacing, and/or orientation that is determined based on the second reference electronic document (or representation thereof) to determine and/or extract the actual dollar amount from the target electronic document. By utilizing one or more extraction models as opposed to a single, universal extraction model (e.g., a single deep neural network), computing resources can be conserved.

The type of data extracted may depend on the type of the electronic document. In instances where the target electronic document is a financial document (e.g., an invoice), the type of data may be an invoice date, invoice number, amount due, due date, vendor's name or contact information (e.g., an address, a phone number, an e-mail), a vendor website, or other relevant content. For example, referring FIG. 2, relevant data may comprise a due date 208 of 'Oct. 3, 2019', a total amount due 202 of '$146.11', a vendor name 210 of 'Acme', an invoice date 212 of 'Sep. 12, 2013', vendor contact information 214 (such as phone number '1-800-555-1234'), or charges 216 including electrical charges of '$96.91' and current gas charges of '$49.20'. It should be appreciated that this relevant data is merely an example. The data that is extracted may change based on the type of document and the type of industry employing the technology described herein. As such, data other than that which is discussed here may be extracted.

Target document data extractor 140 may output the extracted data to other components of the data extraction system 100. It should be appreciated that the target document data extractor 140 can identify and extract specific portions of text as opposed to extracting and storing the entire text of the electronic document. In some aspects, target document data extractor 140 may cause the relevant data to be stored in database 115. As a further example, target document data extractor 140 may communicate the relevant content to consumer application(s) 150.

Returning to FIG. 1, data extraction system 100 comprises consumer application(s) 150. Generally, consumer application(s) 150 may be any application that utilizes the extracted data. As described below, the consumer application(s) 150 may be a graphical user interface to verify the extracted data, an electronic billing system (e.g., where the extracted data may be used to store an indication that an invoice should be paid), or a virtual assistant (e.g., to remind the user to take action related to an upcoming deadline to pay an invoice).

Figure 3:
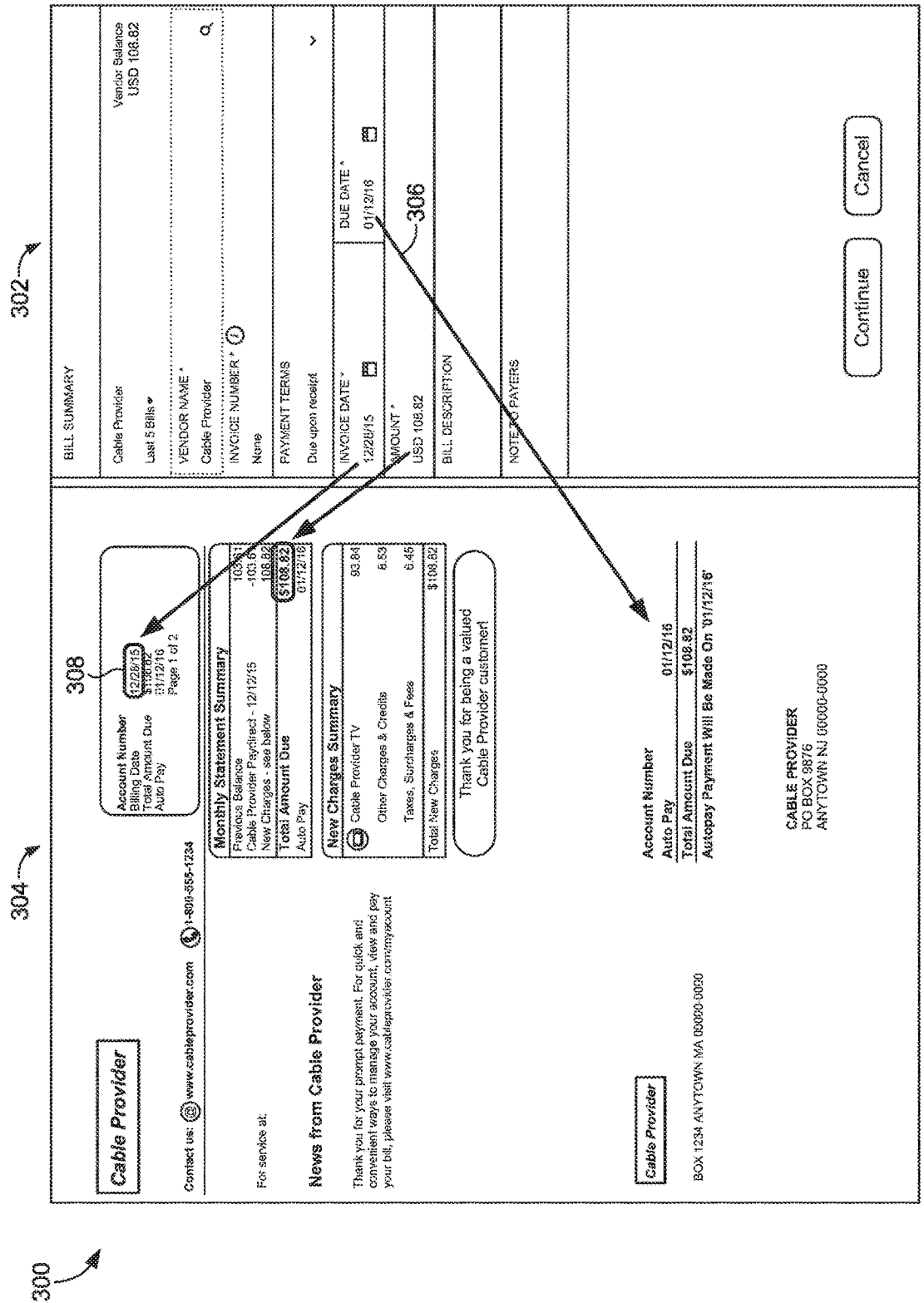
FIG. 3 is an example illustration of a Graphical User Interface (GUI) indicating extracted data by a data storage and extraction system, in accordance with aspects described herein.

In some aspects, a consumer application(s) 150 may include a graphical user interface that causes the extracted data to be presented on a display of a computing device. As illustrated in FIG. 3, graphical user interface 300 comprises a summary window 302 of the extracted data or a preview of an electronic document 304. In some aspects, both the summary window 302 and a preview of an electronic document 304 are output for simultaneous display on the computing device.

In some aspects, graphical user interface 300 facilitates a quick summary of the extracted data, such as where the data was extracted from the electronic document. For instance, graphical user interface 300 may comprise one or more visible indicia that indicates a location within the electronic document from which the data was extracted. The one or more visible indicia may be any visual indicator, including shapes, symbols, highlighting, text (e.g., numeric text), or other visual indictors. As illustrated in FIG. 3, the one or more visible indicia may be an arrow 306 having an origin beginning in summary window 302, proximate the data. The arrow 306 may have an arrow head that terminates in the electronic document, at a location proximate to where the data was extracted from within the electronic document. As mentioned, the one or more visible indicia may also be a shape. As indicated by reference number 308, the one or more visible indicia includes a shape, such as a rectangle.

In some aspects, consumer application(s) 150 may include an electronic billing system. The electronic billing system may provide an electronic inventory of past invoices. Additionally, the electronic billing system may allow for automatic payment of an invoice. As such, consumer application(s) 150 may assist in a user managing and/or triggering future transactions based on the data.

In some aspects, consumer application(s) 150 may include a virtual assistant. For example, the virtual assistant may provide alerts or reminders regarding important dates contained in the electronic document. In some aspects, the virtual assistant may schedule a calendar reminder for a due date of an invoice. Additionally, the virtual assistant may provide audio feedback of relevant portions of an electronic document as opposed to having the entire text of the electronic document read aloud, which may be highly beneficial to a visually impaired user to identify the most relevant content quickly and easily.

Figure 4:
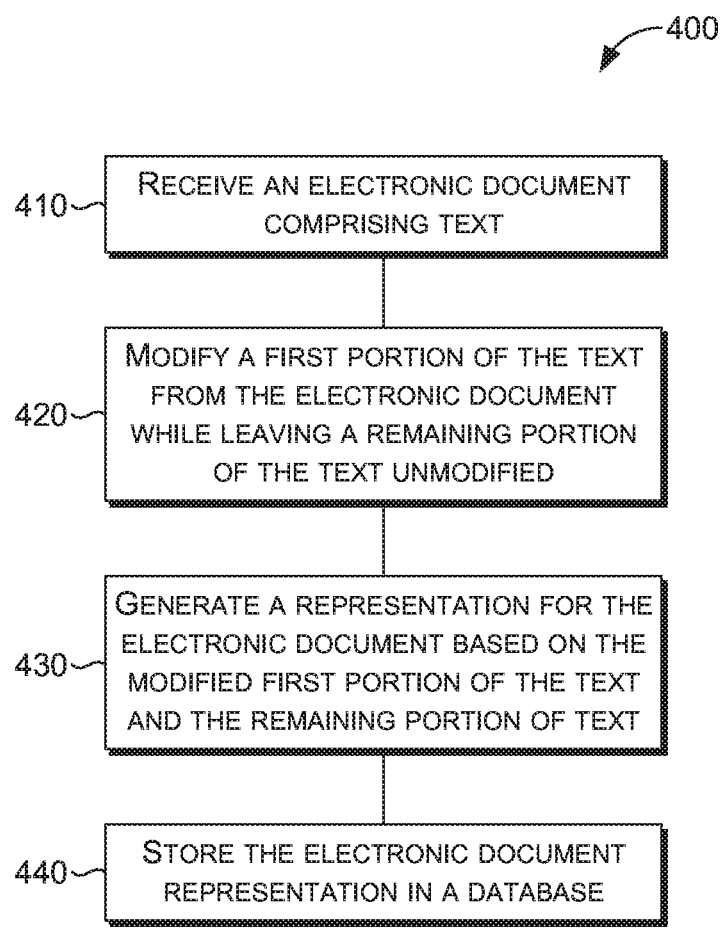
FIGS. 4-5 are flow diagrams illustrating example methods for data storage and extraction, in accordance with aspects described herein.
Figure 5:
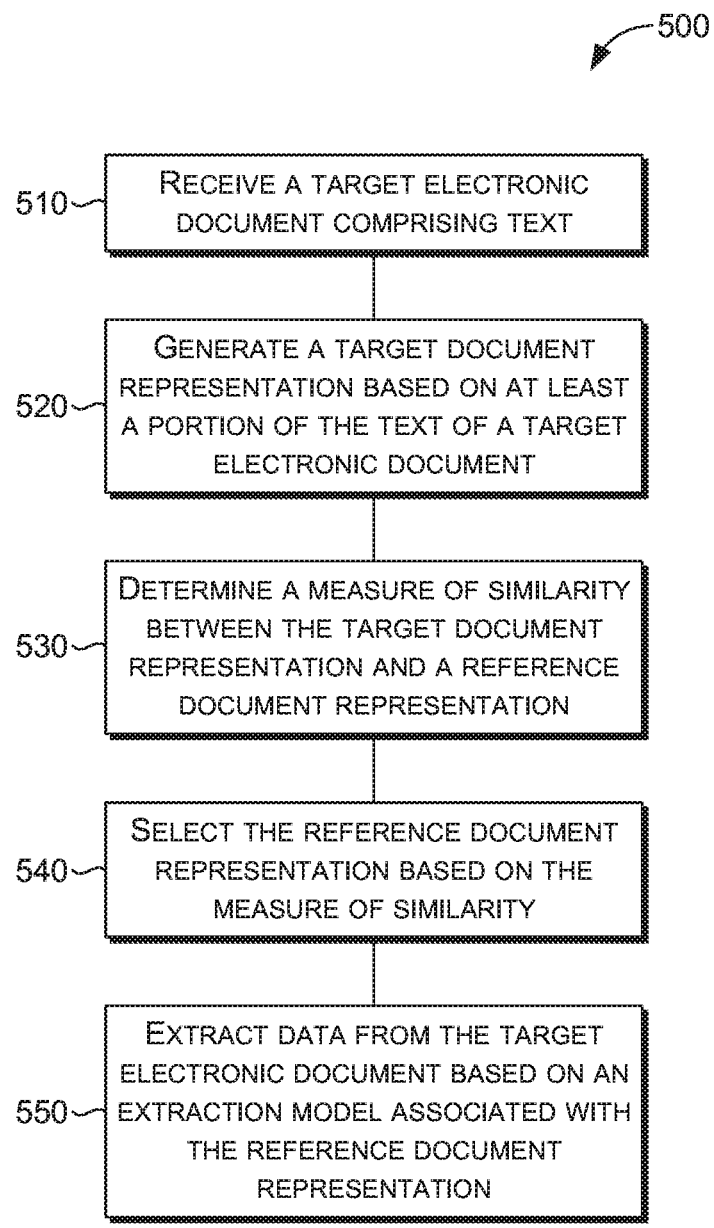

With reference to FIGS. 4-5, flow diagrams are provided to illustrate methods for providing a data extraction and storage of electronic documents. The methods may be performed using the data extraction system 100 described herein. In embodiments, one or more computer storage media having computer-executable instructions embodied thereon that, when executed by one or more processors, cause the one or more processors to perform the methods in the data extraction system 100.

Referring to FIG. 4, a flow diagram is provided illustrating an overview of an example process flow 400 for generating a representation of an electronic document. The method 400 can be used, for instance, when generating reference document representations and/or target document representations. At block 410, an electronic document comprising text is received. The electronic document may be received from a computing device 105 that communicates a scanned image of a physical document to the document similarity engine 120 or database 115. The electronic document may comprise text. In some aspects, text determiner 122 may analyze the electronic document to determine the text associated with the electronic document.

At block 420, a first portion of the text from the electronic document is modified while leaving a remaining portion of the text unmodified. In some aspects, text modifier 124 may modify the text based on being associated with a predefined type of text. Text modifier 124 may modify the text by deleting or removing text. Additionally or alternatively, text modifier 124 may modify the text by deleting or removing the first portion of text and adding or inserting standard text. The standard text may be a generic set of text that is used across a plurality of electronic documents, including a reference electronic document or a target electronic document. For instance, text modifier 124 may modify the text of a reference document representation by removing a customer name of 'Jim Robinson' and replacing it with standard text of 'John Smith'.

At block 430, a representation for the electronic document is generated based on the modified first portion of the text and the remaining portion of text. The representation of the electronic document may comprise the text in any form or structure. In some aspects, the representation comprises one or more vector that are generated based on the modified first portion of the text and the remaining portion of text. For instance, vector generator 126 generates one or more vectors. In some aspects, vector generator 126 can generate one or more vectors (e.g., one or more reference vectors) for one or more reference electronic documents. Similarly, vector generator 126 may generate one or more vectors (e.g., one or more target vectors) for a target document.

At block 440, the electronic document representation can be stored in a database. Text modifier 124 or vector generator 126 can cause one or more reference vectors or one or more target vectors to be stored in a database 115. In some aspects, the electronic document representations may be stored as a group of reference document representations that may be compared to future electronic document representations.

Referring to FIG. 5, a block diagram is provided illustrating an overview of an example process flow 500 for extracting data from a target electronic document. At block 510, a target electronic document comprising text is received. In some aspects, document similarity engine 120 receives the target electronic document. For instance, document similarity engine 120 may receive the target electronic document from computing device 105 or database 115.

At block 520, a target document representation is generated based on at least a portion of the text of a target electronic document. Text modifier 124 or vector generator 126 may generate the target representation. In example aspects, vector generator 126 generates a target vector based on modified text. For example, vector generator 126 may generate a vector based on a modified portion of the text and a remaining portion of text that has not been modified.

At block 530, a measure of similarity between the target document representation and a reference document representation having been generated from a reference electronic document is determined. Document similarity determiner 128 may determine the measure of similarity between the document representations. In configurations where the document representations are vectors, document similarity determiner 128 can determine a measure of similarity using a cosine similarity function, such as a standard dot product similarity function or a customized dot product similarity function.

At block 540, the reference document representation is selected based on the measure of similarity. In some aspects, document similarity determiner 128 selects a reference electronic document based on the measure of similarity satisfying a similarity score. The reference document representation may be a representation that is generated from a reference electronic document. Additionally, the reference document representation may be associated with an extraction model.

At block 550, data is extracted from the target electronic document based on an extraction model associated with the reference document representation. In some aspects, target document data extractor 140 extracts data from the target document. In some aspects, target document data extractor 140 may utilize an extraction model that is specific to the selected reference document representation. The extraction model may rely on a known location of text or text type associated with the reference electronic document that was used to generate the reference document representation. The known location of text may be based on at least one of absolute coordinates, relative coordinates, surrounding text, or other features that identify a location of a particular type of text. Using the known location, the target document data extractor 140 may identify and extract data from the target document. By utilizing an extraction model associated with the reference vector, computing resources may be conserved while improving the accuracy of the computer in identifying relevant portions of data to extract. For example, it may eliminate the need for complex algorithms that require large amounts of training data and require large amounts of computer processing power, which results in less accurate content extraction and typically take longer periods of time. However, the technologies described herein provide greater accuracy in data extraction and minimize computing processing power.

Having described an overview of embodiments of the present technology, an example operating environment in which embodiments of the present technology may be implemented is described below in order to provide a general context for various aspects of the present technology. Referring to FIG. 6, in particular, an example operating environment for implementing embodiments of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrates an example computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. The memory may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. One or more computer-readable media devices having computer-executable instructions embodied thereon that, when executed by one or more processors, cause the one or more processors to perform operations comprising:

receiving an electronic document comprising text;
identifying predefined text in the text of the electronic document;
determining a first location of the predefined text in the electronic document;
modifying a first portion of the predefined text from the electronic document and leaving a remaining portion of the text unmodified, the modifying incudes deleting the predefined text;
based at least in part on the determining of the first location, the modified first portion of the predefined text and the remaining portion of the text, generating a representation for the electronic document;
storing the representation of the electronic document in a data store;
in response determining that a measure of similarity between a target electronic document representation and the representation for the electronic document satisfies a particular score, determining a second location of data at a target electronic document, the target electronic document representation representing the target document; and
in response to the determining of the second location, causing presentation, at a user interface, of visible indicia that indicates the second location within the target electronic document.

2. The one or more computer-readable media devices of claim 1, wherein the electronic document representation is associated with one or more vectors and is grouped with a set of reference vectors.

3. The one or more computer-readable media devices of claim 2, wherein the set of reference vectors are associated with one or more data extraction models that are used for the extracting of data from the target electronic document.

4. The one or more computer-readable media devices of claim 3, wherein the operations further comprising:
generating a target vector from a portion of text associated with the target electronic document; and
wherein the determining of the measure of similarity includes determining a measure of similarity between the target vector and a reference vector.

5. The one or more computer-readable media devices of claim 4, wherein the operations further comprising: updating the representation based on receiving a confirmation that the target vector corresponds to the reference vector.

6. The one or more computer-readable media devices of claim 4, wherein a cosine similarity function is used to determine a measure of similarity, and a denominator of a cosine similarity function is determined based on comparing a function of the norm of the target vector with a function of the norm of the reference vector.

7. The one or more computer-readable media devices of claim 1, further comprising: determining that the target document representation is associated with a same entity as the stored representation of the electronic document.

8. The one or more computer-readable media devices of claim 1, wherein the operations further comprising:
generating a target vector from a second portion of text associated with the target electronic document; and
wherein the determining of the measure of similarity includes determining a measure of similarity between the target vector and a reference vector associated with the representation of the electronic document based at least in part on comparing a first function of a first norm of the target vector with a second function of second norm of the reference vector.

9. A system comprising:
one or more processors; and
one or more computer-readable media having computer-executable instructions embodied thereon that, when executed by the one or more processors, cause the one or more processors to perform operations comprising:
receiving an electronic document comprising text;
modifying a first portion of the text from the electronic document and leaving a remaining portion of the text unmodified;
generating a representation for the electronic document based on the modified first portion of the text and the remaining portion of text;
storing the representation of the electronic document in a data store;
generating a target vector from a second portion of text associated with a target electronic document; and
determining a measure of similarity between the target vector and a reference vector associated with the representation of the electronic document based at least in part on comparing a first function of a first norm of the target vector with a second function of second norm of the reference vector;
based at least in part on the comparison, changing the measure of similarity;
based at least in part on the changing of the measure of similarity, extracting data from the target electronic document.

10. The system of claim 9, wherein the modifying includes deleting the first portion of the text.

11. The system of claim 10, wherein the modified text comprises a predefined type of text and the modifying includes adding a standardized text.

12. The system of claim 10, wherein generating the target vector comprises generating one or more vectors based on the modified text.

13. The system of claim 9, wherein the determining of the measure of similarity is based on using a data extraction model that utilizes a known location to determine a location of data in the electronic document.

14. The system of claim 9, wherein a cosine similarity function is used to determine the measure of similarity.

15. The system of claim 14, further comprising: determining a denominator of the cosine similarity function based on the comparing.

16. A computer-implemented method comprising:
receiving an electronic document comprising text;
identifying predefined text in the text of the electronic document;
determining a first location of the predefined text in the electronic document;
modifying a first portion of the predefined text from the electronic document and leaving a remaining portion of the text unmodified;
generating a representation for the electronic document based on the modified first portion of the predefined text and the remaining portion of text; and
storing the representation of the electronic document in data store
determining that a measure of similarity between a target electronic document representation and the representation for the electronic document satisfies a particular score, the target electronic document representation representing a target document;
based at least in part on the measure of similarity satisfying the particular score and the determining of the first location, extracting data from the target electronic document; and in response to the extracting of the data from the target electronic document, causing presentation, at a user interface, of visible indicia that indicates a second location within the target electronic document from which the data was extracted.

17. The computer-implemented method of claim 16, wherein the modifying compromises removing the first portion and adding a standardized text.

18. The computer-implemented method of claim 17, further comprising: determining that a target vector associated with the target electronic document and a reference vector associated with the electronic document are associated with a same source entity.

19. The computer-implemented method of claim 16, wherein an extraction model utilizes heuristics to determine a location of text in the electronic document.

20. The computer-implemented method of claim 19, wherein the location of text is based on at least one of absolute coordinates, relative coordinates, or surrounding text.

\* \* \* \* \*